(12) United States Patent
Boozer (10) Patent No.: US 11,684,216 B2
(45) Date of Patent: Jun. 27, 2023

(54) REVERSE DRAFT OPEN TOP BLENDING CONTAINER

(71) Applicant: VITA-MIX MANAGEMENT CORPORATION, Olmsted Township, OH (US)

(72) Inventor: Richard D. Boozer, Wakeman, OH (US)

(73) Assignee: VITA-MIX MANAGEMENT CORPORATION, Olmsted Township, OH (US)

(*) Notice: Subject to any disclaimer, the term of this patent is extended or adjusted under 35 U.S.C. 154(b) by 233 days.

(21) Appl. No.: 16/967,434

(22) PCT Filed: Feb. 5, 2019

(86) PCT No.: PCT/US2019/016568
§ 371 (c)(1),
(2) Date: Aug. 5, 2020

(87) PCT Pub. No.: WO2019/152963
PCT Pub. Date: Aug. 8, 2019

(65) Prior Publication Data
US 2021/0212520 A1    Jul. 15, 2021

Related U.S. Application Data

(60) Provisional application No. 62/626,336, filed on Feb. 5, 2018.

(51) Int. Cl.
*A47J 43/00* (2006.01)
*A47J 43/07* (2006.01)
*A47J 43/046* (2006.01)

(52) U.S. Cl.
CPC ........ *A47J 43/0727* (2013.01); *A47J 43/046* (2013.01); *A47J 43/0772* (2013.01)

(58) Field of Classification Search
CPC ... A47J 43/046; A47J 43/0772; A47J 43/0727
See application file for complete search history.

(56) References Cited

U.S. PATENT DOCUMENTS

| | | | | | |
|---|---|---|---|---|---|
| 3,627,008 | A | * | 12/1971 | Samuelian | A47J 43/0766 241/199.12 |
| 5,360,176 | A | * | 11/1994 | Mugge | A47J 43/046 241/282.1 |
| 2015/0258514 | A1 | | 9/2015 | Boozer et al. | |
| 2016/0007802 | A1 | | 1/2016 | Boozer et al. | |
| 2016/0309960 | A1 | * | 10/2016 | Kolar | A47J 43/0766 |
| 2017/0245688 | A1 | | 8/2017 | Hewitt et al. | |
| 2018/0008097 | A1 | | 1/2018 | Mehlman | |
| 2018/0140137 | A1 | | 5/2018 | Barnard et al. | |
| 2019/0001288 | A1 | | 1/2019 | Ciepiel et al. | |

OTHER PUBLICATIONS

Patent Cooperation Treaty (PCT), International Search Report and Written Opinion for Application PCT/US2019/016568 filed Feb. 5, 2019, dated Apr. 29, 2019, International Searching Authority, US.

* cited by examiner

*Primary Examiner* — Anshu Bhatia
(74) *Attorney, Agent, or Firm* — McDonald Hopkins LLC (57) ABSTRACT

A container comprises a body and a base. The body includes an open end and a closed end. The closed end is attached to the base. The closed end may be welded to the base. Cross-sectional perimeters of the body decreases from the closed end to the open end.

11 Claims, 5 Drawing Sheets

REVERSE DRAFT OPEN TOP BLENDING CONTAINER

CROSS-REFERENCE TO RELATED APPLICATIONS

This application is a 35 U.S.C. 071 national stage application of PCT Application No. PCT/US2019/016568 filed on Feb. 5, 2019, entitled "REVERSE DRAFT OPEN TOP BLENDING CONTAINER," which claims priority to U.S. Provisional Patent Application No. 62/626,336 entitled "REVERSE DRAFT OPEN TOP BLENDING CONTAINER," filed on Feb. 5, 2018, each of which are incorporated herein by reference in their entirety.

TECHNICAL FIELD

The present disclosure relates to a blending system and, more particularly, to a blending container with a reverse draft.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blenders. Such drinks also may be made at home, using a personal blender.

Difficulties in making any such drinks (examples of which are identified above), or utilizing blenders, include creating a desired blend consistency as foodstuff is blended. In an example, during blending of foodstuff, blades may be rotated by a motor. The blades may force foodstuff toward an inner wall of a container. The food may form a vortex or funnel shape about the blades. This vortex shape may result in the blades being exposed or partially free of foodstuff during the blending. The ingredients may coat the walls of the container and may be pushed outward away from the blades. The foodstuff will not be processed by the blades, and extra time may be needed to blend or otherwise prepare the foodstuff.

Therefore, a need exists for improved systems and methods for blending ingredients.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Described herein is a blending container for blending foodstuff comprising a body comprising sidewalls extending from an open end to a closed end, wherein the draft of the sidewalls generally decreases from the closed end to the open end, and a base operatively attached to the closed end of the body. The closed end may comprise a perimeter that is larger than the perimeter of the open end. The body and the base may be separately constructed. The body may comprise a molded material. The blending container may include a lid operatively attachable to the open end. In an example, the body may comprise an inner wall and an outer wall. The draft of the inner wall may generally decrease in perimeter length from the closed end to the open end. In some examples, the container may comprise a wireless tag disposed on or within the container. The tag may be hermetically sealed in at least one of the body, the base, or in between the body and base.

Also described herein is a method of forming a container comprising molding a container body, wherein the container body comprises a first end and a second end, forming a container base, and attaching the container base to the second end of container body to form a seal therebetween. The method may further comprise welding the second end of the container body to the container base. The method may further comprise adhering the second end of the container body to the container base. The method may further comprise fastening the second end of the container body to the container base. The method may further comprise overmolding the container base on the second end of the container body. The method may further comprise molding the container body such that the pitch of the body decreases towards the first end of the body from the send end of the body that is attached to the container base.

Also described is a blending system comprising a blender base comprising a housing that houses a motor, a container operatively attachable to the blender base, the container comprising, a container body comprising an open end, a closed end, and a side wall extending between the closed end and the open end, wherein the perimeter of the open end is generally smaller than the perimeter of the closed end, a container bottom operatively attached to the closed end to form a seal between the container bottom and the closed end, a blade assembly operatively attachable to the blender base, and a lid operatively attachable to the open end of the container body. The sidewalls may comprise a draft that generally decreases from the closed end to the open end. The seal may comprise a welded seal. The blending system may further comprise at least one of a near field communications tag or radio frequency identification tag disposed between the container body and the container bottom. The at least one of a near field communications tag or radio frequency identification tag may be hermetically sealed.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, etc.

Various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored in a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Open top blending containers are designed in a similar fashion. The bottom of the blending container is smaller dimensionally than the top. One reason for this is to allow the container to be manufactured through a molding process. The draft of the container walls enables the container to be released from the mold. This general construction is at least in part bound by molding, such as molding of food-grade plastics. As such, when making open top blending containers through molding, one may be limited to the shape and material selection because of the draft issues.

This disclosure recognizes several deficiencies with open top containers having a smaller diameter or perimeter around the base of the container (e.g., proximal a blade assembly) and an increasingly larger diameter or perimeter around the open top. For instance, draft in a container may cause problems with circulation because the further the food product gets from the centerline of the container the slower the food product moves during the blending process. With particularly viscous food products, such as a frozen drinks or smoothies, the food product moves even more slowly than less viscous food products (e.g., juices, soups, etc.). Also, as the blending container starts to get larger on the open end it becomes more flexible which can result in more noise.

In another aspect, blades of a blender reduce the particle size of foodstuff as the blades blend. The blades also force the foodstuff outward and upward. The foodstuff may stick to the side walls of the container. As the dimensions of the top of the container start to get larger, movement of the foodstuff starts to slow down and may eventually stop altogether.

Moreover, as the food product moves outward away from the center an air channel or vortex (cavitation) begins to form in the center of the container that opens up all the way to the blades. At that point blending may completely stop or be significantly reduced. This may result in an uneven blend as some of the food product may be over processed while other parts of it may not even be touched.

In some blending systems, blades may act more like a propeller to suck food into the blades and less like a cutter. This may keep the food product moving. Making blades in this fashion can cause an increase in current and add noise and vibration to the blender due to the large bend angles and imbalance. Moreover, the blades may become less efficient in their ability to cut or blend foodstuff.

Aspects of systems, apparatuses or processes described herein generally relate to blending systems. The blending system includes a container. The container may comprise an open top container having an opening at one end that may receive or otherwise be operatively assembled with a lid, and a closed end that may be proximal a blade assembly. The open end may have a smaller dimension than the closed end. This may drive the food product back into a center line of the container when blending, which may stop cavitation and direct the food product back down to the blade. This may result in a more even blend, more efficient blending, reduced blending time, simplified blades, and reduced noise. In another aspect, embodiments described herein may reduce the need for tampers and other mechanical devices that may otherwise be needed to push food back into the blades and collapse the air channel.

In various embodiments containers may comprise a food-grade material having a body and a bottom. The body and the bottom may be separately molded or otherwise manufactured pieces. The body may be operatively attached to the bottom of the container. This may allow the container body to have a reverse draft or pitch. In at least some embodiments, the container and the body may comprise a three-dimensionally printed container comprising a unitary construction or separate constructions. The three-dimensionally printed container may comprise a food grade plastic, metal, or the like. It is noted that various types of plastic may be utilized. Moreover, three-dimensionally printed containers may comprise similar dimensions as molded containers.

Figure 1:
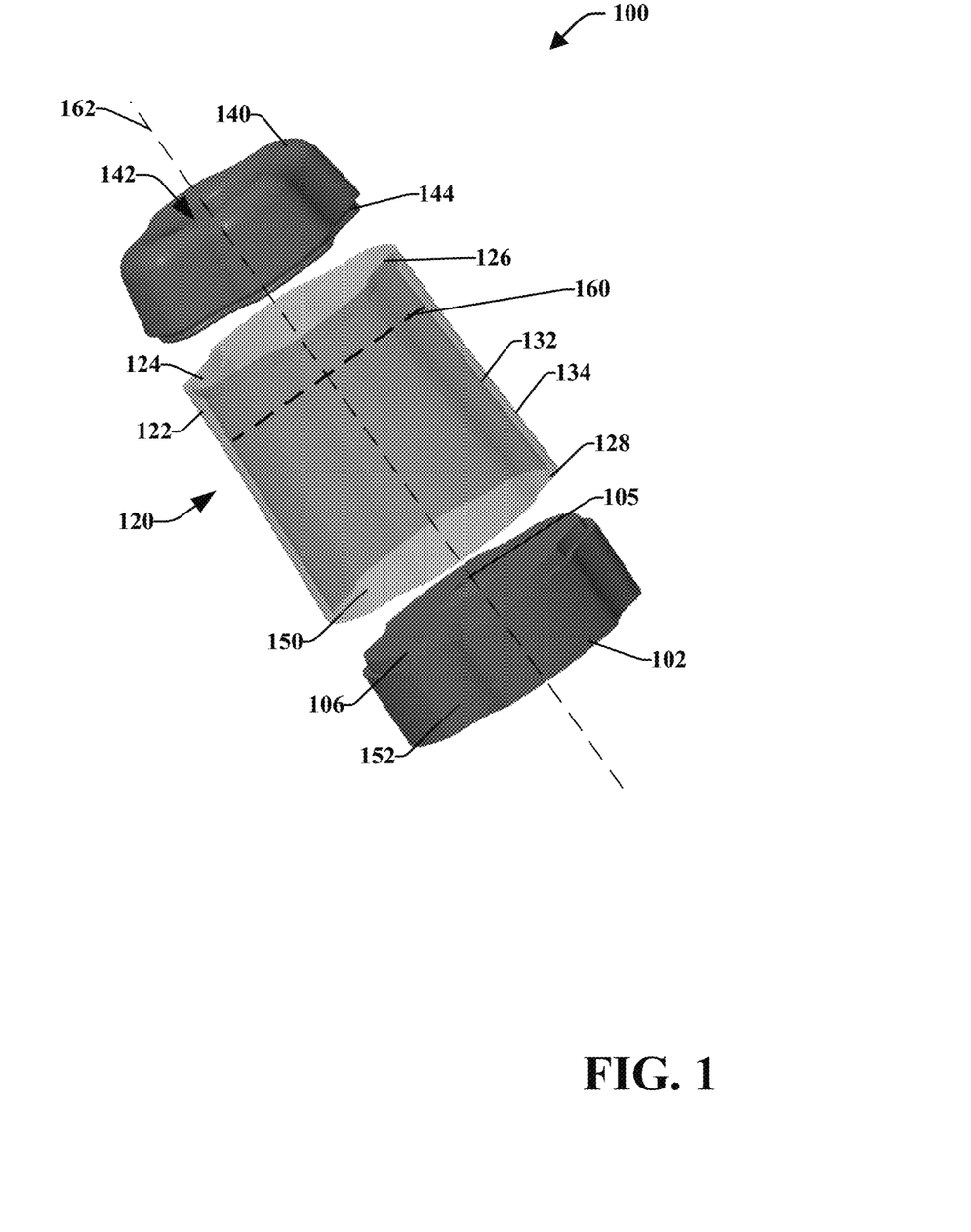
FIG. 1 is an exploded view of a blending container in accordance with various embodiments described herein.
Figure 2:
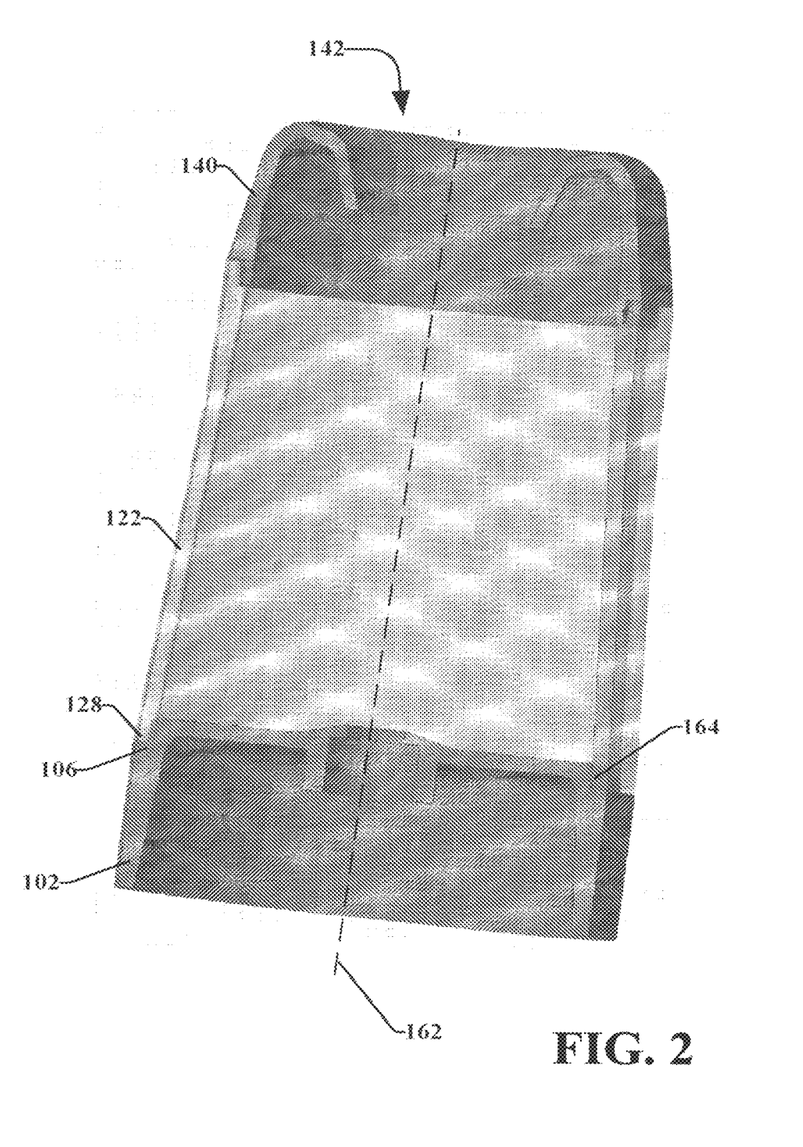
FIG. 2 is a cross-sectional view of the blending container of FIG. 1 in accordance with various embodiments described herein.

Referring now to FIGS. 1-2, there depicted is an exploded view and a cross sectional view of a container 100 for a blending system that may receive foodstuff. The container 100 may include and/or be coupled with a blender base as described herein. It is noted that the container 100 may comprise materials such as metals, plastics, glass, or other food grade materials. In at least one embodiment, the container 100 may comprise a moldable plastic material.

The container 100 may comprise appropriate configurations to allow for holding and mixing foodstuff therein. While the container 100 may have various embodiments such as a single serving container, a large format container, or the like, examples generally refer to the container 100 as a larger format container for sake of brevity. It is noted that the various aspects disclosed herein, however, may be applicable to other forms of containers, including, without limitation a single serving container.

The container 100 may primarily include body 120 and a closed end or base 102. The base 102 and the body 120 are separately constructed and may then be operatively attached. It is noted that the base 102 may include an opening 105 for receipt or attachment of a blade assembly as described herein. The body 120 may include sidewalls 122 that may comprise single-walled or multi-walled (e.g., double walled) constructions. The sidewalls 122 extend from a first or open end 126 to a second or closed end 128. It is noted that the sidewalls 122 may comprise various shapes, such as frustoconical, cylindrical, an n-sided polygon (where n is a number), or irregular shapes. For instance, the sidewalls 122 may comprise flutes 150 extending at least part way between the closed end 128 and the open end 126.

In another aspect, the body 122 may comprise a moldable, food-grade material (e.g., plastic or similar polymer). The plastic material may be at least partially clear, at least partially opaque, or colored (e.g., red, blue, etc.). In another example, the body 122 may include gradient markings or indicia that mark measurements which allow a user to measure the foodstuff added into container 100.

According to embodiments, a surface of an inner wall 132 of the sidewalls 122 is angled such that the perimeter generally decreases from the closed end 128 towards the open end 126. As such, the closed end 128 is generally larger in diameter than the open end 126. The draft, or angle of the sidewalls 122, may be referred to as "reverse" as other blending containers may generally increase the perimeter of the sidewalls from closed end to open end.

The open end 126 may receive or be attached with a lid 140 in an operative position. The lid 140 may include an aperture 142 in which a user may place ingredients during blending or utilize a tamper. In some embodiments, the lid 140 may include a lip 144 that may nest within a lip 124 of the body 120. It is noted that the lid 140 and the body 120 may be attached via other mechanisms or configurations.

The closed end 128 of the body 102 may be secured or otherwise attached to the base 102. The base 128 and the closed end 128 may be fastened together by mechanical, chemical, magnetic, or other fasteners. For instance, the closed end 128 may be overmolded with the base 102. In another aspect, the base 102 and the closed end 128 may be welded (e.g., via ultrasonic welding), mechanically fastened together (e.g., via screws, bolts, or the like), or adhered together via an adhesive or otherwise sealingly attached such as by being threaded together. In some embodiments a gasket (not shown) may be positioned between the base 102 and the closed end 128. Additionally or alternatively, the container 100 may comprise a singular construction, such as a metal container that is bent or otherwise physically shaped. In another example, the container 100 may be constructed via three-dimensional printing and be formed from any appropriate material.

In an example, as shown in FIG. 2, the base 102 may include a ledge 106 that is operatively shaped to receive the closed end 128 of the body 120. As such, ledge 106 may comprise a shape or perimeter that compliments the shape of the closed end 128. In at least one aspect, a gasket or other material may be disposed at the joint 164 to create a seal (such as a water-tight seal preventing foodstuffs from escaping), such as through welding. It is noted that the container 100 may be dishwasher safe.

It is noted that the body 120 and the base 102 may comprise different materials, the same materials, or similar materials. In one embodiment, the body 120 may comprise a clear plastic material and the base 102 may comprise an opaque material, such as a darker colored plastic. Moreover, a less expensive material may be utilized for the base 102 as it may not experience the same impact as the body 120 or may not need to the same transparency level as the body 120. Further, the base 102 may be utilize different colors so as to indicate the type of use. By way of a non-limiting example, the base 102 of one version may be red, which represents that dairy products are blended in that container 100. A different container 100 may utilize a blue base 102 to represent that no dairy products are blended in that container 100. The bases 102 of the various containers 100 may have a different color to represent different allergens or no allergens are utilized in that specific container 100.

The reverse draft of the sidewalls 122 may direct food product back to the center line 162 of the container 100. The food product may be pushed out from the blades and up the sidewalls 122 and back into the center line 162 of the container 100. This may reduce or eliminate cavitation and the slowing down of the food product and allow the blades to be made less like a propeller and more like a cutter. The blades could be made smaller with less bend and do just as much work with less noise and vibration. In some embodiments, the blades may be made larger than traditional containers as the base 102 may have an increased size. Larger blades may create a more aggressive blending process, which may reduce the blend time, increase the efficiency of the blend, or improve the overall smoothness of the blend.

In some embodiments, the terminal portion of the closed end 126 may flair outward and/or may include a spout. Thus, while the open end 126 may be increased in diameter or measurements at its terminal point, the pitch or draft generally decreases from the closed end 128 towards the open end 126. For instance, a cross-section 160, located between the open end and closed end 128 and the open end 126, may have a perimeter that is smaller than the perimeter of closed end 128.

Additionally or alternatively, the container 120 may include an outer wall 134 and the inner wall 132. The outer wall 134 and the inner wall 132 may comprise differently shaped or drafted surfaces. For instance, the inner wall 132 may comprise a reserve draft, where the perimeter decreases towards the open end 126. And the outer wall 134 may comprise a perimeter that increases towards the open end 126 or is at a zero degree angle.

According to various embodiments, the container 100 may comprise one or more interlock devices that allow a blender base to determine when the container 100, lid 140, and the blender base are operatively assembled. If operatively assembled, the blender base will allow operation of a motor and may otherwise disable or prevent a motor from operating. The interlocking devices may be operatively configured to allow for the body 120, base 102, and lid 140 to comprise separate constructions. In an example, an NFC device may comprise a coil that is positioned about the ledge 106 and sealed between the ledge 106 and closed end 128. This may simplify construction as well as hermetically seal the NFC device. It is noted that the container 140 may also include an NFC device. In some embodiments, the NFC device may be installed between the base 102 and the body 120. The base 102 and the body 120 being of separate components may make adding the NFC device during production (or even as an after-market part) easier. In some embodiments, the NFC device may comprise a ring that fits in the ledge 106 or otherwise between the body 120 and base 102. In some embodiments, the base 102 and/or body 120 may be produced to include a cavity or a portion in which the NFC device can be added during production or thereafter as an after-market component.

In other examples, an interlock may include a magnetic switch, such as a reed relay or reed switch. For instance, the open end 126 may comprise a magnet that detects the presence of the lid 140. If detected, a switch may close. The closed end 128 may comprise another magnetic switch that interacts with the base 102 to provide a signal when the lid 140 is detected. It is further noted that the base 102 may comprise an additional or alternative magnet that interacts with a reed relay or switch or a Hall Effect sensor of a blender base.

Figure 3:
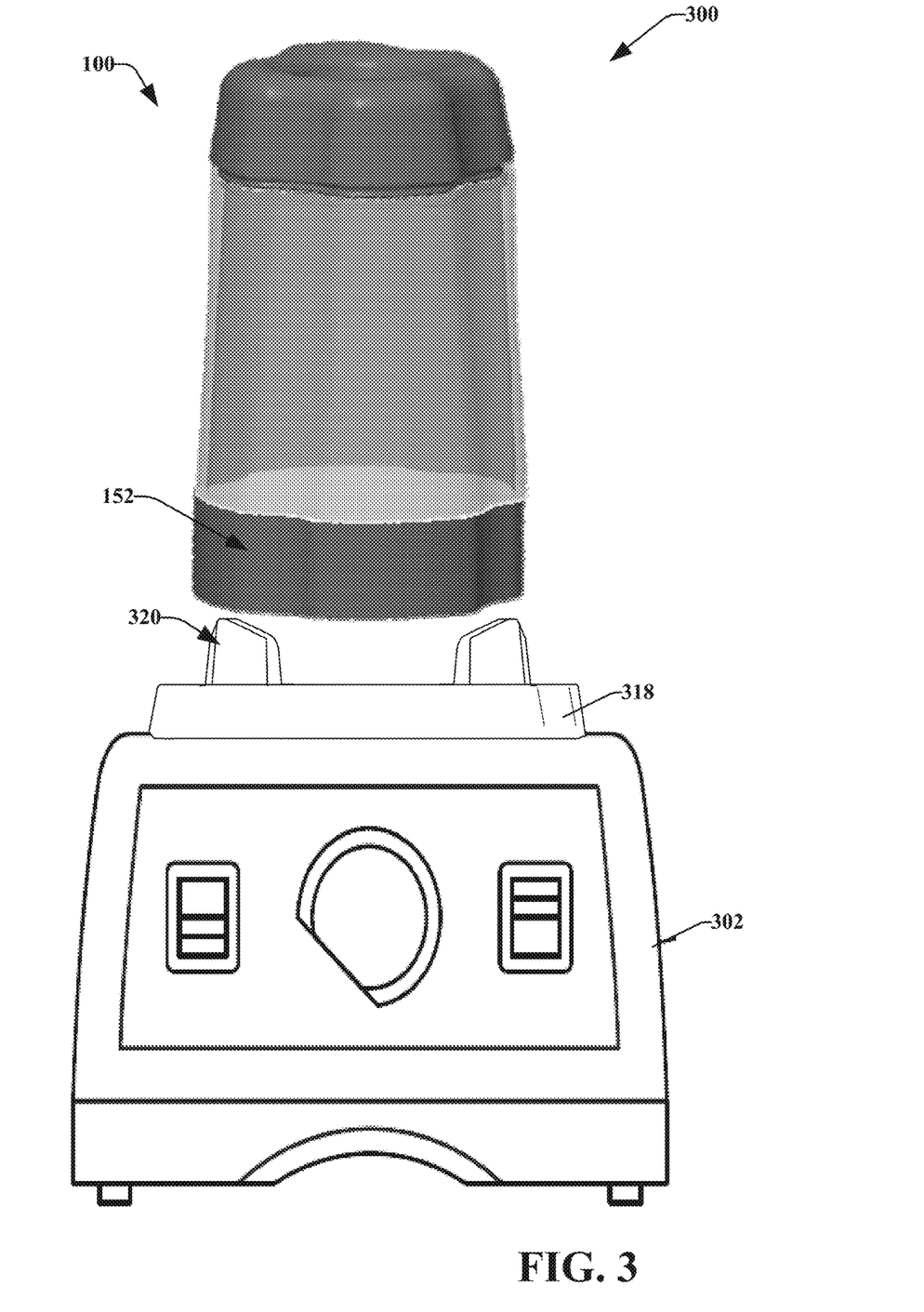
FIG. 3 is an environmental view of a blending system comprising a blender base and the blending container of FIG. 1 in accordance with various embodiments described herein.

FIG. 3 illustrates a blending system 300 primarily comprising the container 100 and a blender base 302. The blender base 302 may include a pedestal comprising one or more protrusions 320. The container 100 may include one or more groves 152 formed in the base 102 that operatively interact with the protrusions 320 to secure or otherwise prevent the container 100 from rotating during operation of a motor.

Figure 4:
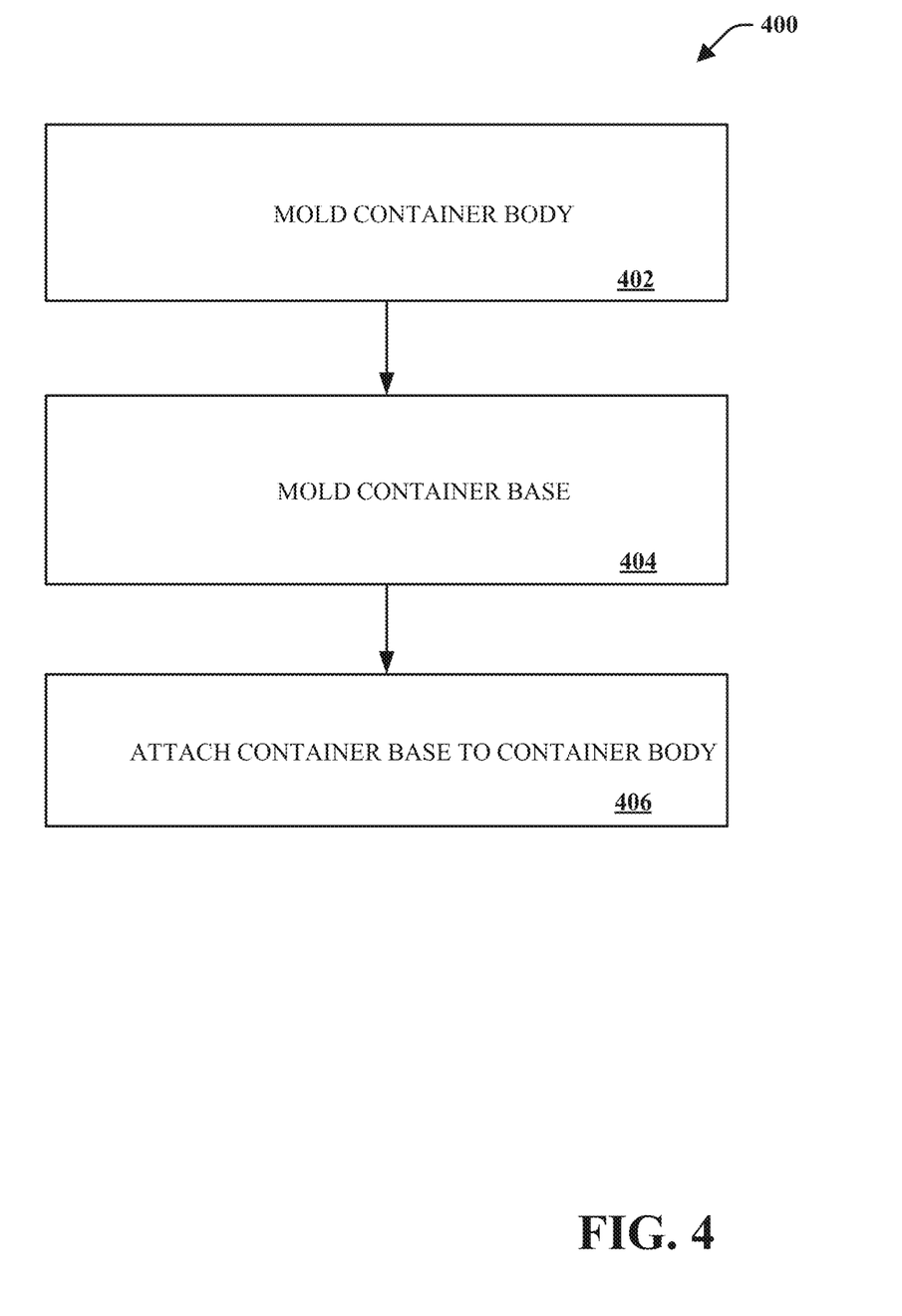
FIG. 4 is a flow diagram of an exemplary method associated with assembling a blending container in accordance with various embodiments described herein.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 4 depicts an exemplary flowchart of non-limiting method 40 associated with assembling or otherwise manufacturing a container for a blender, according to various aspects of the subject disclosure.

At 402, the container body may be molded. Molding may include injection molding of a plastic material, such as a food-grade plastic such as Triton. The container body may be shaped with a reverse draft as described herein. It is noted that the molding of the body may include forming of indicia, placement of interlock devices, or the like.

At 404, the container base may be molded, assembled or otherwise constructed. The base may comprise a similar or different material as the body. In another aspect, the base may be shaped to matingly attach to the container body. It is further noted that the base may be molded to include interlocking devices or the like.

At 406, the container base and the container body may be attached together. Attaching the body and base may include application of adhesives, mechanical fasteners, welding, or the like. In one exemplary embodiment, the container base and container body may each include mating threads (one may have male threads while the other female threads) and the components may be threaded together. Further in other embodiments, the container base and container body may be press fit or friction fit together. It is noted that the body and base may form a joint that is sealed to prevent foodstuff from exiting the container. For example, seals may be utilized (whether integrally created or subsequently added) to seal the components together. In such embodiments, an NFC device may be installed at the joint between the base and body.

Figure 5:
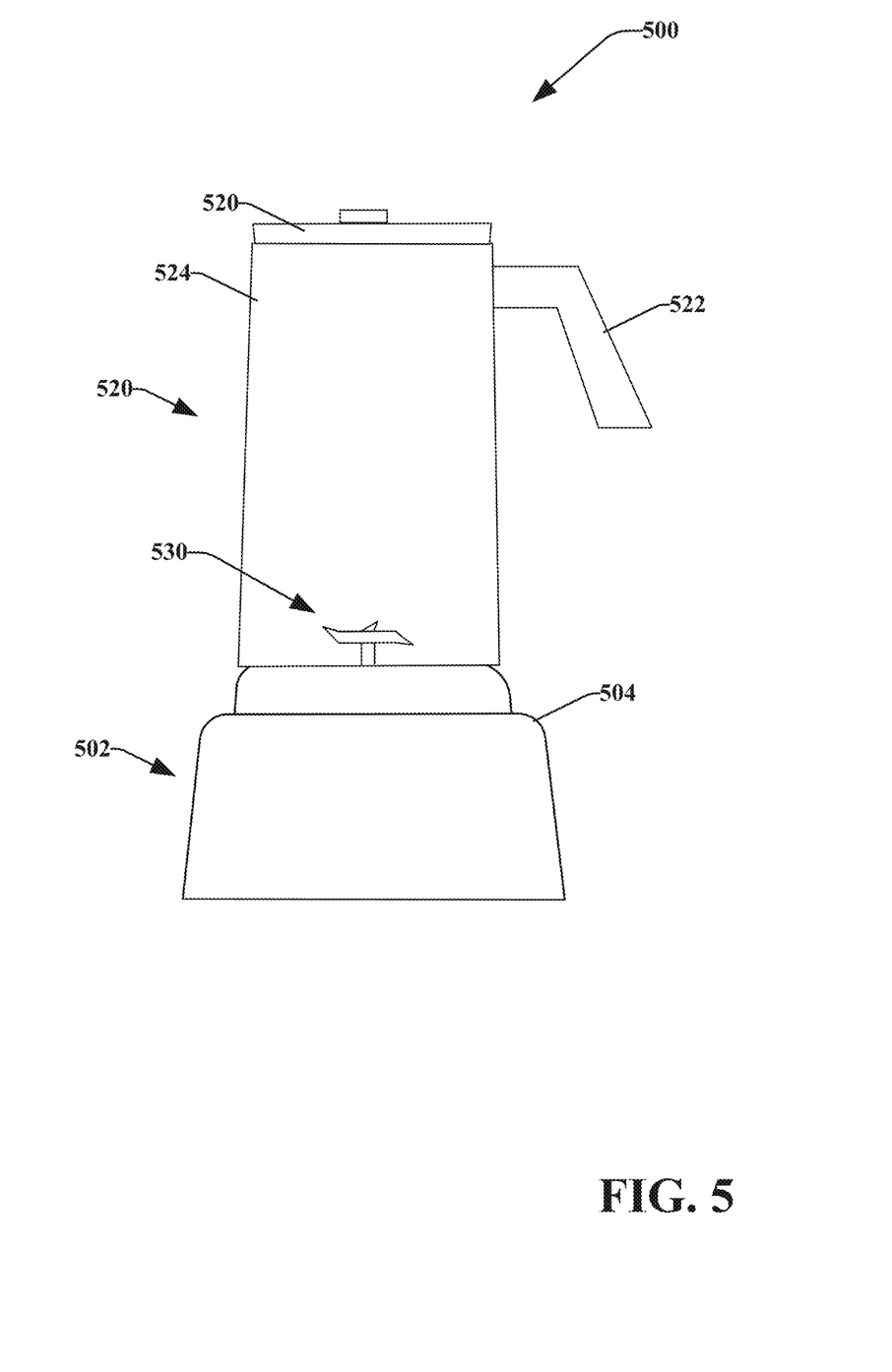
FIG. 5 is a blender device in accordance with various embodiments described herein.

FIG. 5 illustrates an exemplary blending system 500 in accordance with various disclosed embodiments. System 500 may utilize various disclosed aspects. For example, the system 500 may include a reverse draft container.

System 500 primarily includes a blender base 502, a container 520 operatively attachable to the blender base 502, a blade assembly 530, and a lid 540 that may be operatively attached to the container 520. The container 520 may include walls 524 and a handle 522. Foodstuff may be added to the container 520 for blending. It is noted that the container 520 may comprise various materials such as plastics, glass, metals, or the like, including, without limitation Triton. In another aspect, container 520 may be powered in any appropriate manner. It is also noted that the container 520 may comprise a reverse draft construction as described herein.

The blade assembly 530, container 520, and base 502 may removably or irremovably attach. The container 520 may be powered in any appropriate manner. While shown as a large-format system, system 500 may comprise a single serving style system, where the container is filled, a blender base is attached to the container, and then the container is inverted and placed on a base.

The base 502 includes a motor disposed within a housing 504. The motor selectively drives the blade assembly 530 (e.g., cutting blades, chopping blades, whipping blades, spiralizing blades, etc.). The blade assembly 530 may agitate, impart heat, or otherwise interact with contents within the container 520. Operation of the blender system 500 may impart heat into the contents within container 520.

In at least one embodiment, the blending system 500 may identify or detect whether the system 500 is interlocked through mechanical detection (e.g., push rods), user input, image recognition, magnetic detection (e.g., reed switches), electronic detection (e.g., inductive coils, a near field communication (NFC) component), or the like.

Moreover, the blending system 500 may identify or detect a type (e.g., make, model, etc.) or receive information pertaining to the container 520 mechanical detection (e.g., push rods), user input, image recognition, magnetic detection (e.g., reed switches), electronic detection (e.g., inductive coils, a NFC, RFID), or the like. In an example, the container 520 may include an NFC tag, RFID tag, or other identifier disposed on or within the container 520. That tag may be positioned on or within any portion of the container 520. For instance, the tag may be disposed within side walls, a bottom, top, or other position. In another example, the tag may operatively attach to the container 520 via adhesives, fasteners, clips, or the like. The tag may be hermetically sealed to prevent damage during use. For instance, the tag may be disposed within a compartment of a body or a base of the container 520. In an example the body may include a compartment in which the tag is located and the bottom may overmold the compartment to hermetically seal the tag therein. It is noted that the container 520 may be submersible in liquid and may be machine washable.

The tag may include an identifier (ID) that defines the type of the container so that the base 502 may select appropriate blending patterns for the container 520, verify the container as an appropriate container for the base, or may download blending patterns for the container 520 from a user device or remote database. In other examples, the tag may include blending patterns that may be communicated from the tag to the base 502.

The base 502 may include an NFC component or other wireless communication device that operatively communicates with the tag, e.g., NFC component(s), on or within the container 520. The base 502 may include a controller that may select blending patterns based on identification of the container 520. In another aspect, the controller may detect errors, such as a removed lid or the like System 500 and processes described herein generally relate to blending or food-processing systems and include a blade assembly 530 comprising one or more inductive coils. In another aspect, one or more of the blade assembly 530 and/or lid may comprise an NFC component that may interact with an NFC component of a blender base. The NFC component of the blender base may receive information regarding the type of the blade assembly 530 and the blender base may utilize the information to determine a blending process to be utilized by the system. For instance, the blade assembly 530 may comprise cutting discs, cutting blades, shearing assemblies, or the like.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the blending system 100. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system comprising:
    a blender base comprising a housing that houses a motor;
    a container operatively attachable to the blender base, the container comprising:
        a container body comprising an open end, a closed end, and a side wall extending between the closed end and the open end, wherein the perimeter of the open end is generally smaller than the perimeter of the closed end;
        a container bottom operatively attached to the closed end to form a seal between the container bottom and the closed end, wherein the closed end is substantially planar and comprises a perimeter that comprises a cross shape that includes a plurality of vertices; and
    a blade assembly operatively attachable to the blender base, wherein the side wall comprises a plurality of flutes extending from the plurality of vertices of the perimeter of the closed end towards the open end.

2. The blender system of claim 1, wherein the container body and the container bottom are separately constructed.

3. The blender system of claim 1, wherein the container body comprises a molded material.

4. The blender system of claim 1, wherein the container body comprises an inner wall and an outer wall.

5. The blender system of claim 4, wherein the draft of the inner wall generally decreases in perimeter length from the closed end to the open end.

6. The blender system of claim 1, further comprising a wireless tag disposed on or within the container.

7. The blender system of claim 6, wherein the tag is hermetically sealed in at least one of the container body, the container bottom, or in between the container body and container bottom.

8. The blender system of claim 1, wherein the sidewalls comprise a draft that generally decreases from the closed end to the open end.

9. The blender system of claim 1, wherein the seal comprises a welded seal.

10. The blender system of claim 1, further comprising at least one of a near field communications tag or radio frequency identification tag disposed between the container body and the container bottom.

11. The blender system of claim 10, wherein the comprising at least one of a near field communications tag or radio frequency identification tag is hermetically sealed.

\* \* \* \* \*